L. NESEMANN.
MOVING PICTURE MACHINE.
APPLICATION FILED JULY 17, 1908.

955,189.

Patented Apr. 19, 1910.
4 SHEETS—SHEET 1.

WITNESSES
Julius H Smith
A. Redmond

INVENTOR
Louis Nesemann
BY
Criswell & Criswell
ATTORNEYS

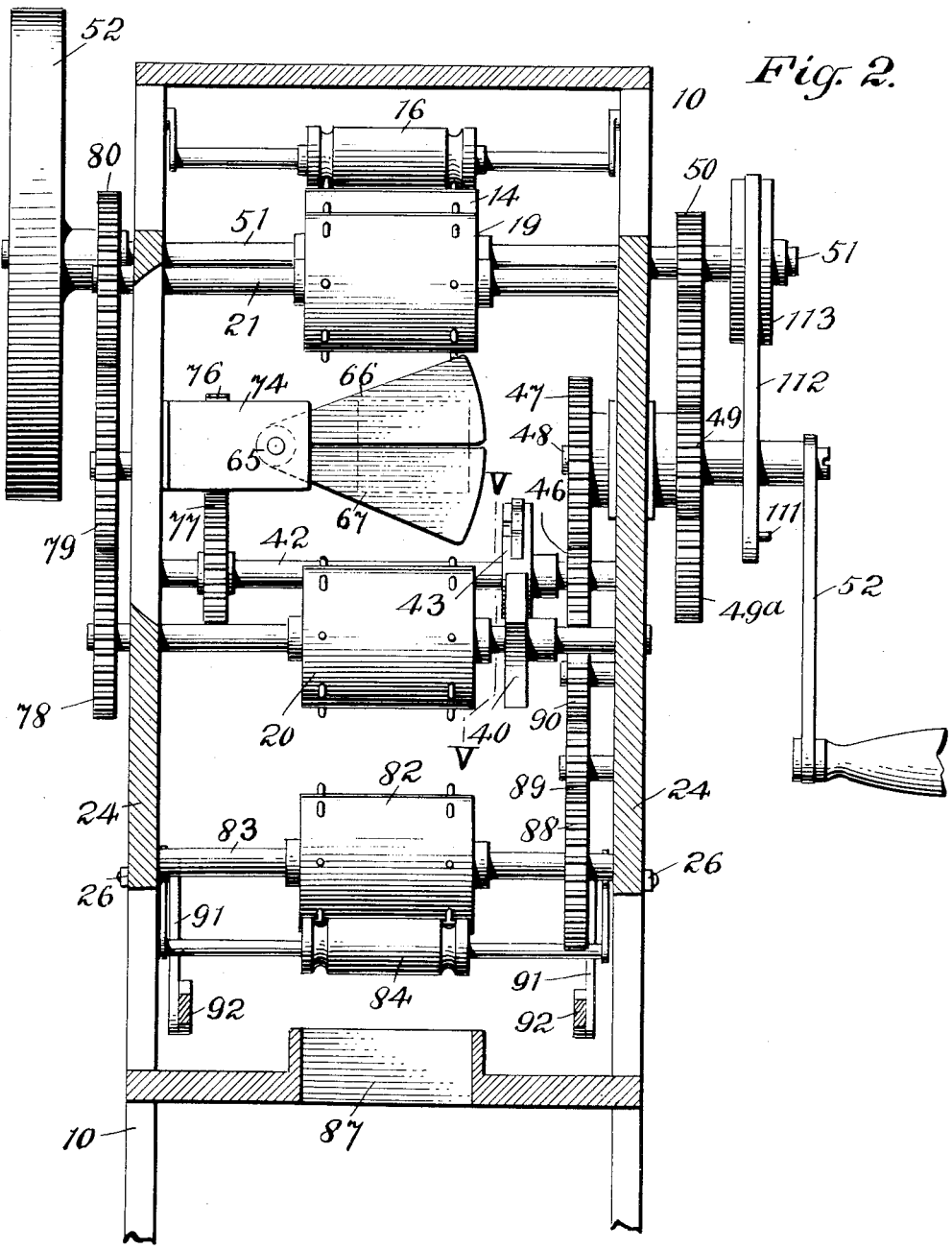

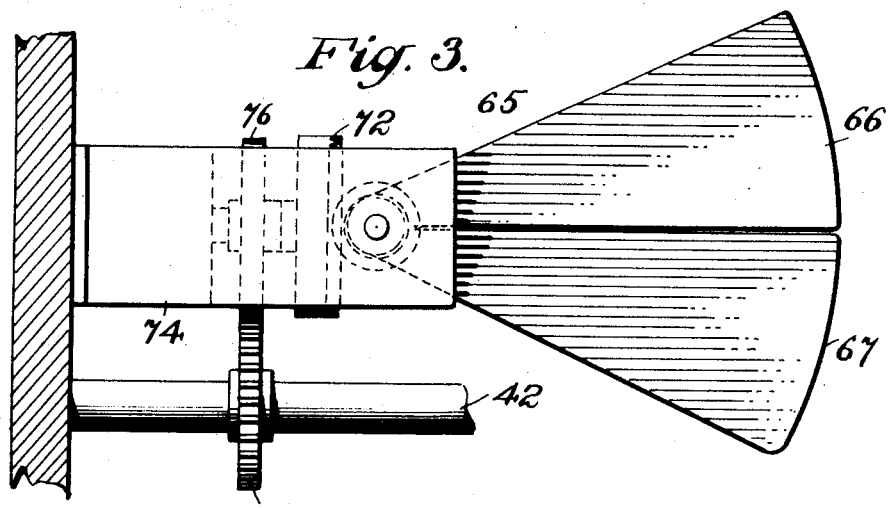
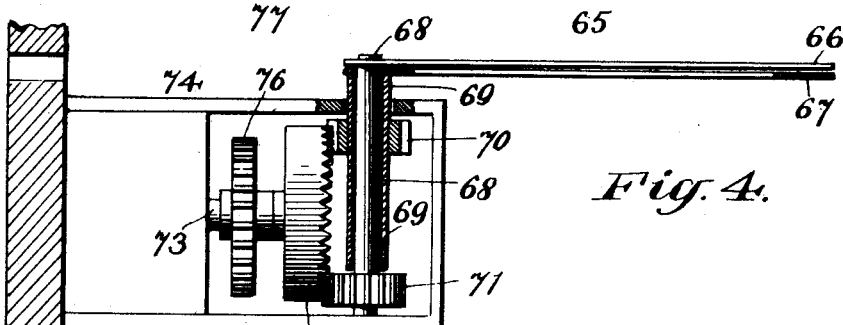
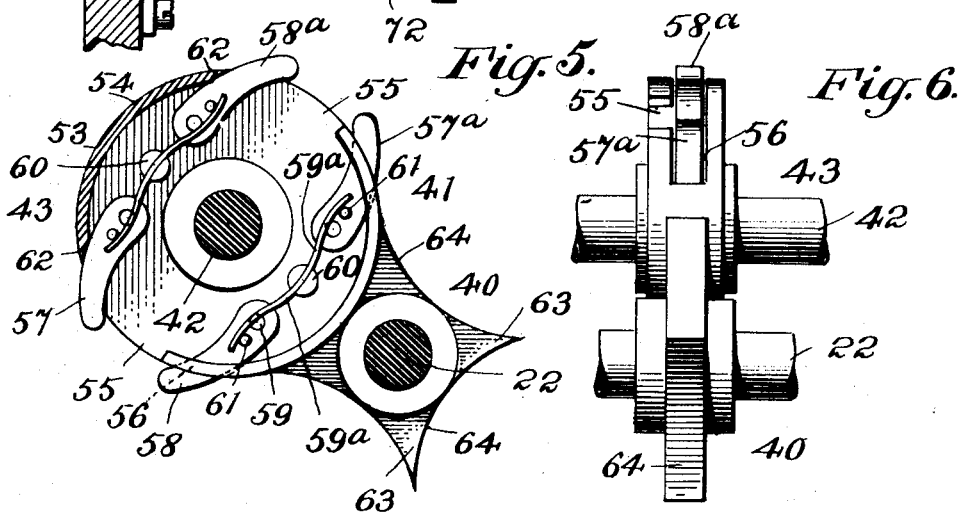

L. NESEMANN.
MOVING PICTURE MACHINE.
APPLICATION FILED JULY 17, 1908.

955,189.

Patented Apr. 19, 1910.
4 SHEETS—SHEET 4.

WITNESSES
Julius H. Hintz
A. Redmond.

INVENTOR
Louis Nesemann
BY
Criswell & Criswell
ATTORNEYS

UNITED STATES PATENT OFFICE.

LOUIS NESEMANN, OF NEW YORK, N. Y.

MOVING-PICTURE MACHINE.

955,189.　　　　　　Specification of Letters Patent.　　Patented Apr. 19, 1910.

Application filed July 17, 1908. Serial No. 444,044.

*To all whom it may concern:*

Be it known that I, LOUIS NESEMANN, a citizen of the United States, and a resident of New York, county and State of New York, have invented certain new and useful Improvements in Moving-Picture Machines, of which the following is a full, clear, and exact description.

This invention relates more particularly to a machine in which the pictures are produced on a film and projected therefrom on to a screen.

The primary object of the invention is to provide simple and efficient means whereby the film may be properly fed and positively held as the pictures are successively presented in front of the lens of the projecting device and the film positively and successively moved in such a way that the interval of time during which each picture is at rest will greatly exceed the time in which the film is moved to present another picture, so that the interval of time in which the film is moved may be reduced to a minimum and each picture given a maximum exposure, thus overcoming many of the objections incident to machines of this character as ordinarily constructed and doing away with all flickering due to the usual method of changing one picture to another.

Other objects of the invention are to provide means for positively holding and guiding the film entirely free of any springs or means for holding the same at the point of exposure and without scratching or injuring the film in any way; to provide simple and efficient means for adjusting the film to properly position the same with respect to the projecting device; and to provide a simple and effective means for preventing the film from being ignited from without the apparatus.

A further object of the invention is to provide a simple and efficient shutter which is operated in such a way as to reduce to a minimum the time in which the space between the lens and the film is covered so that the film may be moved very quickly to expose the successive pictures.

With these and other objects in view, the invention will be hereinafter more particularly described with reference to the accompanying drawings, which form a part of this specification, and will then be pointed out in the claims at the end of the description.

Figure 1:
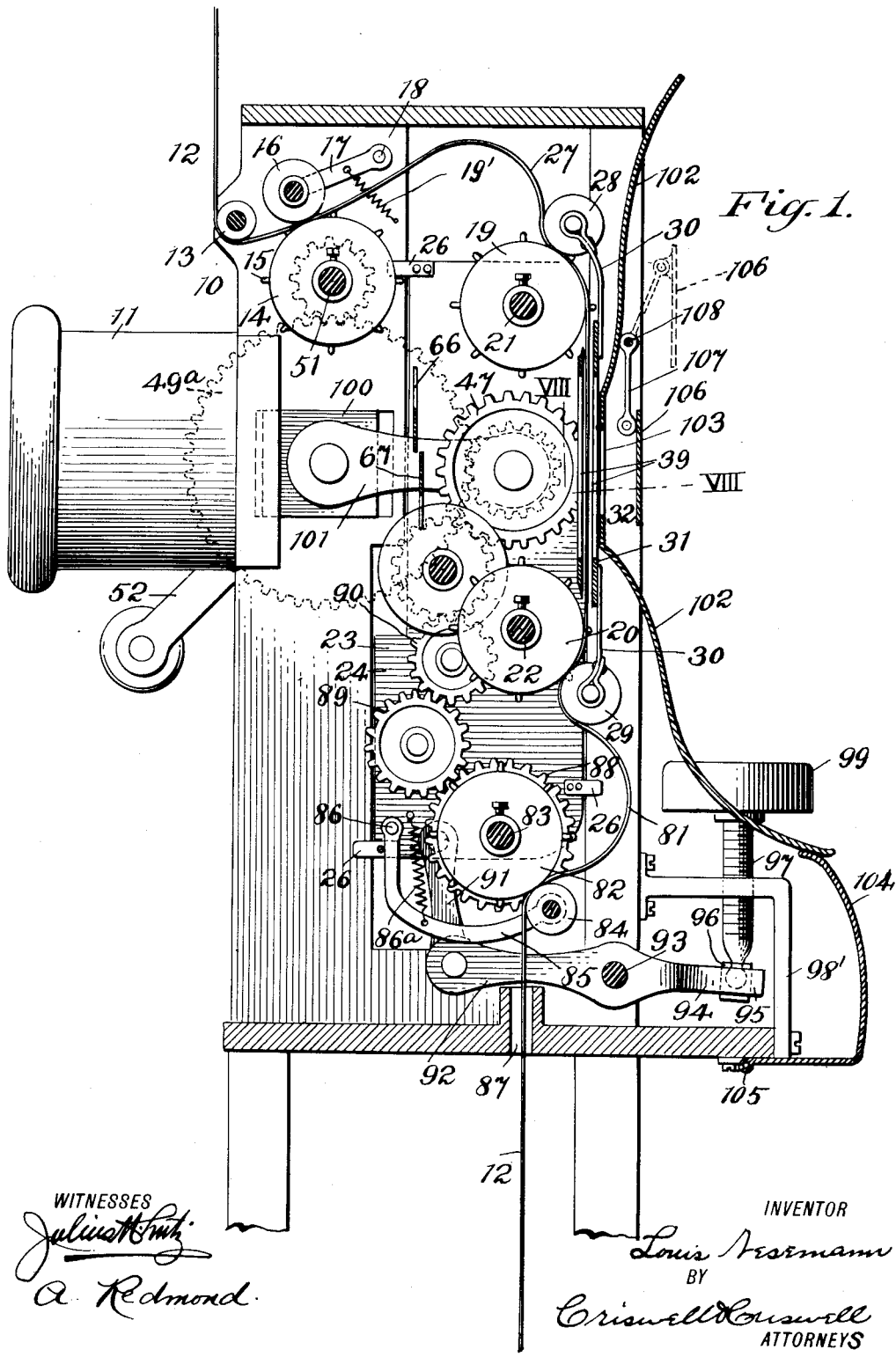
Figure 7:
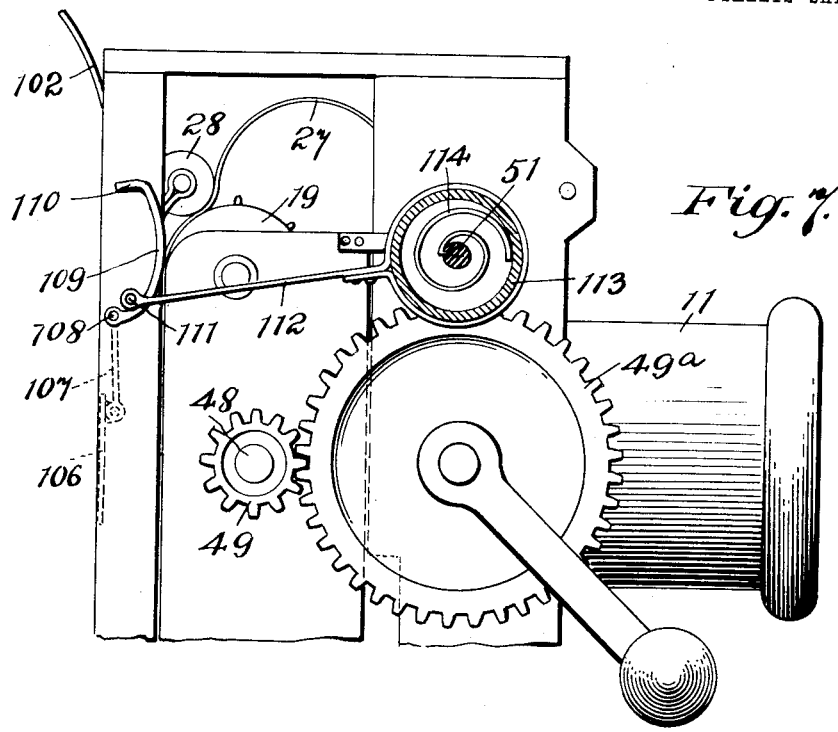
Figure 8:
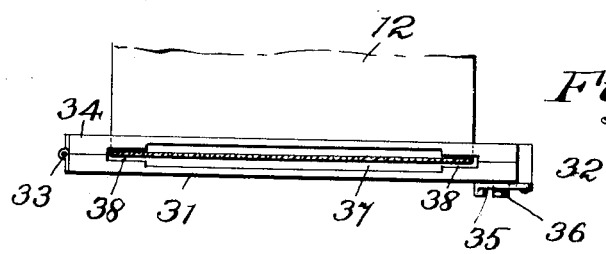
Figure 9:
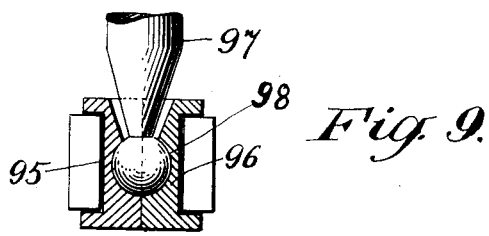

In the drawings, Figure 1 is a vertical section, partly in elevation, of one form of apparatus or machine embodying my invention. Fig. 2 is a vertical section, partly in elevation, looking from the rear of the machine. Fig. 3 is an enlarged elevation of one form of shutter and operating mechanism that may be employed. Fig. 4 is a plan view, partly in elevation, of the shutter and operating mechanism therefor. Fig. 5 is a vertical section, partly in elevation, taken on the line V—V of Fig. 2, showing means for intermittently moving the film. Fig. 6 is an end elevation of the mechanism shown in Fig. 5. Fig. 7 is a fragmentary elevation, partly in section, showing the means for operating the shutter. Fig. 8 is a fragmentary sectional plan taken on the line VIII—VIII of Fig. 1; and Fig. 9 is a fragmentary section showing one means for holding the end of the adjusting screw for raising or lowering the frame carrying the film-operating mechanism.

While I have shown the invention as applied to a projecting moving picture machine, it will be understood that many of the parts may be used in connection with a machine for photographing or producing the pictures.

The frame or casing 10 of the apparatus may be of any suitable construction and arranged within the casing is a projecting device 11 of the usual or of any preferred construction, and movable in the rear of the lens of the projecting device is a film 12. This film 12 has the usual photographic representations of different positions of moving objects, and may have at its edges openings so as to be engaged by the teeth of sprocket wheels or drums to hold the same properly. As shown the film passes into the casing 10 at the rear thereof from a reel or other source of supply, and passes around a roll or idler 13, and from said idler to a drum or sprocket wheel 14, the teeth 15 of which are adapted to enter the perforations or openings at the edges of the film. The film is normally held against the drum 14 by means of a roll 16 which may be suitably grooved to permit the teeth 15 of the drum 14 to pass by the same, and said roll may be carried by one or more arms 17 which are pivoted at 18 to the casing and normally forced in one direction by a spring 20, so that said roll may be quickly released from the drum 14 in order that the film may be readily threaded through the machine and pass around the drums or sprockets 19 and 19'. These drums 19 and 19' are positively driven, as will be hereinafter described, and have their shafts 21 and 22, respectively, journaled in the side pieces 23 of an adjustable frame 24, the latter being movable in slots in the sides of the casing, and suitably guided therein by means of brackets or fingers 26 or otherwise. The film between the drums 14 and 19 is provided with a slack portion, as at 27, and the film is held to the drum 19 by a roll 28, and against the drum 20 by a roll 29, and said rolls 28 and 29 are each supported by one or more arms 30 which project from a plate 31 forming one member of a guide 32. The member 31 of the guide is hinged at 33 to the member 34, and said member may be provided with a pivoted latch 35 which is adapted to engage a bracket 36 to hold the latch and cause the member 31 to be held properly in position to guide the film 12. Each of the members 31 and 34 is cut away much larger that the thickness of the film to form an opening 37 of such size that the walls thereof will not come in contact with the film during the movement thereof and thereby scratch or otherwise injure the pictures, and said members are cut away as at 38 for a short distance to guide the edges of the film and thereby keep the same properly positioned relatively to the projecting device. The arms or brackets 30 supporting the rolls 28 and 29 may be yielding and when the member 31 is moved inward on its hinge 33 and held as shown best in Fig. 8, the film will not only be held properly to the drums and prevented from buckling or becoming released therefrom, but the members 31 and 34 will also properly guide the film, and said members are each provided with an opening 39 through which the pictures may be thrown on to the screen. By this means the film is properly guided, and springs and the like usually employed in this connection are entirely dispensed with.

The several drums are positively operated, and the film given a quick movement to displace one picture and expose the next one, and to secure this quick movement of the film so that a minimum interval of time will be required for shifting one picture from the point of exposure and presenting another in its stead, and for holding each successive picture the maximum interval of time for the exposure of the same as compared with the change of picture, I provide on the shaft 22, of the drum 20, one member, as 40, of a mechanism 41, and on the shaft 42 the driving member 43 of said mechanism. The shaft 42 is positively driven by means of the gear 46 on said shaft 42 which meshes with the gear 47 on a shaft 48 located within the casing, and on said shaft is a small gear 49 which meshes with the larger gear 49$^a$. The gear 49$^a$ is in mesh with a smaller gear 50 on the main drive shaft 51, and on one end of said shaft 51 may be arranged a belt pulley 52 or other means whereby the shaft 51 may be rotated by a motor or otherwise so as to positively drive the shaft 42 through the train of gears referred to, or the said shaft 42 may be operated by hand, as by the crank 52 held to the end of the shaft 48, thus moving the shaft 42 continuously either by hand or by power, and as said shaft is rotated it will impart movement to the member 43 of the mechanism 41 for intermittently moving the drum shaft 22 for displacing one picture and presenting another in front of the projecting apparatus. This member 43 comprises a wheel or drum-like part 53, Figs. 5 and 6, and on the periphery or rim 54 thereof is arranged a plurality of recesses 55, and on opposite sides of the recesses 55 are slots 56, one for each of the pawls or dogs 57, 57$^a$, 58 and 58$^a$. Each dog or pawl is pivoted at 59, and is normally forced in one direction by means of a spring 59$^a$ which may be held to a post 60 so as to project on opposite sides thereof, and has its outer ends engaging pins 61 carried by the pawls so as to normally force the same against the shoulders 62, though instead of a single spring operating two pawls independent springs of any kind may be used for this purpose.

The member 40 secured to the shaft 22 is substantially star-shaped, and is provided with four projecting arms 63 which are substantially V-shaped in form, and provide a curved guiding surface 64 between them which is adapted to rest against the rim 54 of the member 53 so as to hold the same properly for an interval of time. The pawls are adapted to engage the arms 63 of the star-shaped member 40, and the pawls 57 and 57$^a$ are adapted to intermittently rotate the member 40 in one direction while the pawls 58 and 58$^a$ are adapted to rotate said member 40 in the opposite direction according to the direction of rotation of the member 53, the pawls not acting to rotate the member 40 yielding properly to permit them to pass by the engaging parts or arms 63 of the member 40 as the said member rotates. As will be seen when one of the pawls, as for example, the pawl 57 engages one of the arms it will rotate the same, and the sharp end of the arm will enter the recess 55 adjacent thereto, and as soon as the pawl has passed the arm to enter the curved part 64, the spring holding the pawl will permit the latter to be folded inwardly. This permits a very quick action to be imparted to the shaft 22 of the drum 20, as there is no lost motion, and the time required for giving the shaft 20 one quarter of a rotation is much less than is the case with the usual form of Geneva movement in which slots are provided for intermittently rotating a shaft, and at the same time the said shaft 22 and the drum 20 carried thereby is rigidly held stationary during the exposure of the picture. Instead, however, of employing four pawls, two for rotating the shaft 22 in one direction and two for rotating the same in the opposite direction, only one or a plurality of pawls may be employed for rotating said shaft and the drum 20 in a single or in opposite directions.

To cover the picture in the rear of the projecting device, and to do this in the short period of time corresponding to the change of the pictures due to the quick movement of the mechanism 41 already explained, I provide a shutter 65 having two oppositely movable members 66 and 67. These members or wings are held to rotate in opposite directions in the rear of the projecting device 11 and in front of the film 12 as is usual in such devices, and one member, as 66, is held to a shaft 68, and the other member 67 is held to a sleeve 69. To the sleeve 69 is held a pinion 70, and to the shaft 68 is held a pinion or gear 71, and these gears or pinions 70 and 71 are in mesh with the gear 72 the teeth of which are on the face thereof, so that the pinion 70 and 71 will be operated in opposite directions, thus forcing one member of the shutter in one direction, and the other member of the said shutter in the opposite direction. The gear 72 is secured to a shaft 73 journaled in a casing or frame 74 in a part of which the sleeve 69 and the shaft 68 are also journaled. A gear 76 is held to the shaft 73 and this gear is in mesh with the gear 77 secured to the shaft 42 which carries the member 53 of the intermittent film-operating mechanism 41. The shutter members are thus positively operated by the shaft 42 and in regular sequence to the movement of the shaft 22 carrying the drum 20, and by reason of the fact of their moving in opposite directions the minimum amount of time will be required to cause the same to close the space in advance of the projecting device 11 and only during the quick movement of the film to successively expose the pictures though the shutter may be dispensed with if desired.

A gear wheel 78, Fig. 2, is in mesh with an idler or intermediate gear 79, and this gear in turn is in mesh with the gear 80 on the shaft 21 of the drum 19 so that both of the shafts 22 and 21 are positively driven and so positioned that the film will be properly held between the members 31 and 34 of the film guide to properly present the pictures, the slack portion of which permits the film to be moved intermittently the proper distance for each picture.

Beneath the drum 20, is arranged another slack portion 81 caused by the quick intermittent movement of the film and the drum 82. This drum 82 is held to a shaft 83, and is similarly constructed to the drums 19 and 20, and the film is held against the drum 82 by means of a roll 84 carried by one or more arms 85 which are pivoted at 86 to the adjustable frame 23. The said roll 84 is held normally against the drum 82 by means of a spring 86$^a$, or otherwise, in such a way as will permit the roll 84 to be quickly moved away from the drum for properly threading the film or replacing the same, the said film passing through an opening 87 in a part of the casing where it may be taken up by suitable take-up means, not shown, or in any other desired way. The shaft 83 of the drum 82 has a gear 88, and this gear is in mesh with a pinion 89 which in turn meshes with the gear 90, and this gear 90 is operated by the gear 46, so that all the drums are positively moved from a common source of power and in regular sequence to properly position the pictures.

The adjustable frame 23 has the drums 19, 20 and 82 journaled thereon so as to move the film properly to position the pictures directly in the rear of the projecting device 11 in case the pictures or illustrations thereon are not in alinement with said projecting device. This adjustment of the frame may be accomplished in various ways. As shown each side 24 of the frame 23 is connected by a link 91, and each link is connected to an arm 92 which is held to a shaft 93, one of the arms 92 being provided with a projecting end 94 or a continuation thereof. The end of said arm may be slotted, as at 95, as shown in Fig. 9, and in said end is a box or other sliding device 96 in which is held the end of the screw 97, as by a ball-and-socket joint 98 so that said arm 94 may be moved up and down without placing a strain on said screw. The screw 97 engages a threaded aperture in a bracket 98' and at the upper end of said screw is a fingering portion 99 by which the screw may be rotated and thereby operate the arm 94 and through the shaft 93 raise and lower the frame 23 and the mechanism carried thereby. This adjustable movement of the frame 23 varies the relative position of the gear 49 with respect to the large gear 49$^a$, and to compensate for this the gear 50 has its shaft 48 held in a slidable box 100, Fig. 1, and projecting outward from the box is an arm or bracket 101 which carries the shaft 48 and the gears 47 and 49. The box or bearing 100 is movable in the fixed part of the casing so that as the frame 23 is adjusted the said box or bearing, as well as the gear carried thereby, will have a relative movement in the casing and will thereby hold the gears properly in mesh during the adjustment of the frame 23.

Any suitable means may be provided to prevent the film from being ignited from without, and for this purpose I provide a plate 102 which extends across the front of the apparatus, and is only cut away to permit the rotary movement of the fingering part 99 of the screw 97 which is located at one side of the frame or casing of the machine. This plate 102 may be hinged at one side of the casing so as to swing out of the way thereof to permit access to the interior of the casing, and said plate or door is provided with an opening 103 through which the pictures are projected by the lens tube 11. The plate or door 102 extends close to the guide member 31, and extends upwardly and outwardly above the opening 103, and downwardly and outwardly below said opening, and beneath the plate is arranged a member 104 which is hinged at 105 so as to close the space below the door 102, thereby protecting the entire rear of the machine from fire, except immediately back of the film where the opening 103 is located.

To protect the film at the opening 103 of the door 102, and to automatically close said opening as soon as the apparatus is stopped or to automatically uncover the opening as soon as the apparatus is started, is arranged a shutter, as 106, Figs. 1 and 7, and operating mechanism therefor. This fire shutter 106 is connected by links 107 at opposite sides thereof, and these links are held to a shaft 108. A curved arm 109 is secured to one end of the shaft 108, and this arm is provided at its upper end with a hooked portion 110, and engaging the curved part of the arm 109 is a pin or projection 111 which is carried by the arm or rod 112. This arm 112 is held to a drum 113 which is loose on the main drive shaft 51. A coil or other spring 114 has one end secured to the shaft 51, and at its other end is in frictional engagement with the interior of the drum 113, so that as the shaft 51 rotates the said spring will be caused to frictionally rotate the drum 113 and by means of the arm 112 and pin 111, will force the arm 109 downward, and during this movement will raise the links and thereby the shutter to the position shown in dotted lines in Fig. 1. As soon as the machine stops, the shutter will drop by gravity to the position shown in full lines in Fig. 1 or any desired means may be provided which would tend normally to force the fire shutter 106 in a position to close the opening 103 of the door or plate 102.

From the foregoing it will be seen that simple and efficient means is provided whereby the film is properly held at the projecting point entirely free of the use of any springs or other means which serve to injure the film; that said film is positively held and moved so that the picture will be properly projected; that the means for driving the film is positively moved and may be adjusted relatively with respect to the projecting means or other lens; that simple means is provided for protecting the machine against fire; that simple and efficient mechanism is provided for intermittently moving the film the proper distance to successively present the pictures in projecting position in such a way that the time the film is at rest will greatly exceed the time in which the film is moved for substituting one picture for that of another; and that a simple and efficient shutter is provided in which the film is covered a minimum amount of time corresponding to the movement thereof while the pictures are being changed, thus overcoming all flickering or disturbance of the picture when thrown upon the screen.

Having thus described my invention, I claim as new and desire to secure by Letters Patent:—

1. The combination with a frame and means for supporting and moving a film, of a plate having an opening therethrough adjacent to the film, a fire shutter, means for pivotally supporting the fire shutter adjacent to the opening, a shaft for operating the fire shutter, an arm connected to the shaft, a drive shaft, and means movable with the drive shaft adapted to operate the arm and raise the shutter as the shaft rotates but which permits the shutter to close the opening in the plate immediately said shaft stops.

2. The combination with a frame and means for supporting and moving a film, of a plate having an opening therethrough adjusted to the film, a fire shutter, means for pivotally supporting the fire shutter adjacent to the opening, a shaft for operating the fire shutter, an arm connected to the shaft, a drive shaft, and means movable with the drive shaft adapted to operate the arm and raise the shutter as the shaft rotates but which permits the shutter to close the opening in the plate immediately as said shaft stops.

3. The combination with a frame and means for supporting and moving a film, of a plate having an opening therethrough adjacent to the film, a fire shutter, means for supporting the fire shutter adjacent to the opening, a shaft for operating the fire shutter, an arm connected to the shaft, a drive shaft, and means movable with the drive shaft adapted to operate the arm and raise the shutter as the shaft rotates.

4. The combination with a frame and means for supporting and moving a film, of a fire shutter, means for supporting the fire shutter, an arm connected to the shutter support, a drive shaft, and spring-driven means movable with the drive shaft adapted to operate the arm and raise the shutter as the shaft rotates but which permits the shutter to lower when said shaft stops.

5. The combination with a frame, of a drive shaft, means for supporting and operating a film, a fire shutter, links pivotally held to the fire shutter, a shaft to which the links are secured, a curved arm pivotally held to one end of the shaft and having its other end hooked, a drum loosely held on the drive shaft, a spring secured at one end to the shaft and engaging at its other end with the interior of the drum, and an arm carried by the drum and having a projection adapted to engage the arm to raise the fire shutter when the drive shaft is rotated and to cause the shutter to be restored to its former position as soon as the shaft stops.

6. The combination with a frame, of a drive shaft, means for supporting and operating a film, a fire shutter, links pivotally held to the fire shutter, a shaft to which the links are secured, a curved arm pivotally held at one end to the shaft and having its other end hooked, a drum loosely held on the drive shaft, a spring secured at one end to the shaft and engaging at its other end with the interior of the drum, and an arm carried by the drum and having a projection adapted to engage the arm to raise the fire shutter when the shaft is rotated.

7. The combination with a frame, of a drive shaft, means for supporting and operating a film, an arm connected to the shutter, a drum loosely held on the drive shaft, a spring secured at one end to the shaft and engaging at its other end with the interior of the drum, and an arm carried by the drum and coöperating with the first-mentioned arm to raise the fire shutter when the shaft is rotated and to permit the shutter to be restored to its former position as soon as the drive shaft stops.

8. The combination with a frame, of a drive shaft, means for supporting and operating a film, a fire shutter, links pivotally held to the fire shutter, a shaft to which the links are secured, an arm pivotally held at one end to the shaft, a drum loosely held on the drive shaft, a spring secured at one end to the shaft, and engaging at its other end with the interior of the drum, and an arm carried by the drum and coöperating with the first-mentioned arm to raise the fire shutter when the shaft is rotated and to permit the shutter to be restored to its former position as soon as said shaft stops.

This specification signed and witnessed this 29th day of June A. D. 1908.

LOUIS NESEMANN.

Witnesses:
  M. F. KEATING,
  A. REDMOND.